(12) United States Patent
He et al.

(10) Patent No.: US 11,749,128 B2
(45) Date of Patent: Sep. 5, 2023

(54) ANSWER CORRECTION METHOD AND DEVICE

(71) Applicant: Hangzhou Dana Technology Inc., Zhejiang (CN)

(72) Inventors: Tao He, Zhejiang (CN); Lihui Mao, Zhejiang (CN); Huan Luo, Zhejiang (CN); Mingquan Chen, Zhejiang (CN)

(73) Assignee: Hangzhou Dana Technology Inc., Zhejiang (CN)

( * ) Notice: Subject to any disclaimer, the term of this patent is extended or adjusted under 35 U.S.C. 154(b) by 611 days.

(21) Appl. No.: 16/957,110

(22) PCT Filed: Nov. 21, 2019

(86) PCT No.: PCT/CN2019/119976
§ 371 (c)(1),
(2) Date: Jun. 23, 2020

(87) PCT Pub. No.: WO2020/134750
PCT Pub. Date: Jul. 2, 2020

(65) Prior Publication Data
US 2021/0225188 A1    Jul. 22, 2021

(30) Foreign Application Priority Data

Dec. 28, 2018 (CN) .......................... 201811627111.X
Dec. 28, 2018 (CN) .......................... 201811627136.X

(51) Int. Cl.
*G09B 7/02*   (2006.01)
*G06F 16/903*   (2019.01)
(Continued)

(52) U.S. Cl.
CPC ........... *G09B 7/02* (2013.01); *G06F 16/9024* (2019.01); *G06F 16/90335* (2019.01);
(Continued)

(58) Field of Classification Search
CPC . G09B 7/02; G06F 16/90335; G06F 16/9024; G06V 30/1475; G06V 30/418;
(Continued)

(56) References Cited

U.S. PATENT DOCUMENTS 11,256,760 B1 *  2/2022  Corcoran ................ G06F 16/51
2017/0262738 A1 *  9/2017  Hu ...................... G06V 30/1983
(Continued)

FOREIGN PATENT DOCUMENTS

CN   108733718   11/2018
CN   108932508   12/2018
(Continued)

OTHER PUBLICATIONS

"International Search Report (Form PCT/ISA/210)" of PCT/CN2019/119976, dated Nov. 21, 2019, pp. 1-4.

*Primary Examiner* — Pinalben Patel
(74) *Attorney, Agent, or Firm* — JCIP GLOBAL INC.

(57)   ABSTRACT

The disclosure provides an answer correction method and a device, including: determining the target test paper that matches the test paper to be corrected; marking the area of each answer in the test paper to be corrected as the first answer set, and marking the area of each answer in the target test paper as the second answer set; matching each answer area in the first answer set and the second answer set, and adjusting the position of the answer area in the first answer set on the test paper to be corrected; for each answer area in the second answer set, determining the target answer area in the first answer set according to the position information of the answer area on the target test paper, and correcting the answer in the determined target answer area according to the answer in the answer area. The disclosure can solve the problem in the related art that the accurate position of the
(Continued)

answer filled by the student cannot be identified, thereby affecting the correction of the answer.

17 Claims, 5 Drawing Sheets

(51) Int. Cl.
*G06F 16/901* (2019.01)
*G06V 30/418* (2022.01)
*G06V 30/19* (2022.01)
*G06V 30/146* (2022.01)
*G06V 10/82* (2022.01)
*G06V 30/414* (2022.01)
*G06V 30/10* (2022.01)

(52) U.S. Cl.
CPC .......... *G06V 10/82* (2022.01); *G06V 30/1475* (2022.01); *G06V 30/19093* (2022.01); *G06V 30/414* (2022.01); *G06V 30/418* (2022.01); *G06V 30/10* (2022.01)

(58) Field of Classification Search
CPC ............. G06V 10/82; G06V 30/19093; G06V 30/414; G06V 30/10
See application file for complete search history.

(56) References Cited

U.S. PATENT DOCUMENTS

| | | | |
|---|---|---|---|
| 2017/0371629 A1* | 12/2017 | Chacko | G06F 8/36 |
| 2020/0286402 A1* | 9/2020 | He | G06N 3/08 |
| 2021/0020059 A1* | 1/2021 | Xue | G06V 30/19147 |
| 2021/0209785 A1* | 7/2021 | Unnikrishnan | G06V 20/58 |
| 2022/0317979 A1* | 10/2022 | Araujo Soares | G06F 8/33 |

FOREIGN PATENT DOCUMENTS

| | | | |
|---|---|---|---|
| CN | 109670504 | | 4/2019 |
| CN | 109712043 | | 5/2019 |
| CN | 108733718 B | * | 2/2022 |
| WO | 2007024216 | | 3/2007 |

* cited by examiner detecting the image of the test paper to be corrected, detecting the area of each question to be corrected on the test paper to be corrected, and identifying the text content of the stem of each question to be corrected — S1011 obtaining the feature vector of the question to be corrected according to the text content of the stem of each question to be corrected, and searching in the question bank according to the feature vector of the question to be corrected to find the question closest to the question to be corrected — S1012 summarizing all the test papers where the question closest to the question to be corrected are found, and determining the test paper which satisfies the preset condition as the target test paper that matches the test paper to be corrected — S1013

FIG. 3

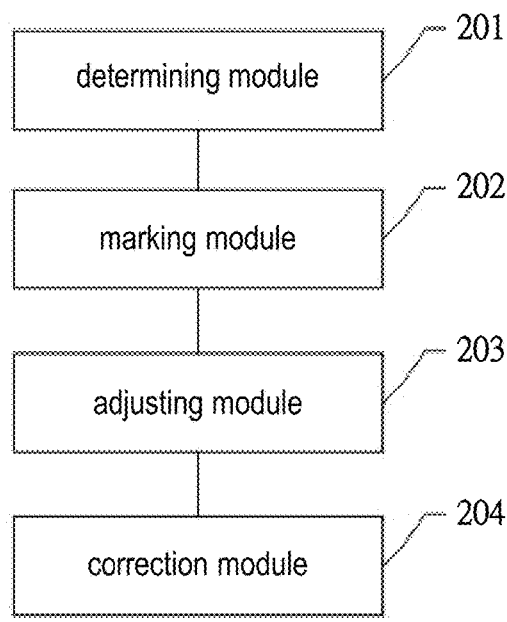

FIG. 4

ANSWER CORRECTION METHOD AND DEVICE

CROSS-REFERENCE TO RELATED APPLICATION

This application is a 371 of international application of PCT application serial no. PCT/CN2019/119976, filed on Nov. 21, 2019, which claims the priority benefit of China application no. 201811627111.X and 201811627136.X, filed on Dec. 28, 2018. The entirety of each of the above mentioned patent applications is hereby incorporated by reference herein and made a part of this specification.

BACKGROUND

Technical Field

The disclosure relates to the technical field of teaching and information processing, in particular to an answer correction method, a device, an electronic equipment and a computer-readable storage medium.

Description of Related Art

With the continuous advancement of computer technology and education informatization, computer technology has been gradually applied to daily education and teaching activities, for example, such technology has been correspondingly applied in teaching evaluation scenarios. Existing primary education in China and the main form of assessment of students' learning progress still rely on various types of examinations or tests. Under the circumstances, teachers are under great pressure to correct test papers.

Currently, there are many APPs in smart terminal products for correcting assignment and test papers. The images containing the test papers to be corrected are input into the search APPs, so that the search APPs can search for the questions corresponding to the questions in the image of test papers from the question bank according to the image of the test papers. The existing method of correcting questions is to compare the answers to various questions on the test paper to be corrected with the answers to the corresponding questions in the question bank, and determine whether the answers are consistent.

However, when students do their assignment or fill in the answers on the test paper as shown in FIG. 1, the answers 11, 12 and 13 might not be always filled in the right place and are likely to extend beyond the effective area or occupy the effective answering area for other questions like the answers to various oral calculation questions filled by students as shown in FIG. 1. In that case, it is not possible to recognize the correct position of the answer filled in by students, which consequently will affect the correction of answers.

SUMMARY

Technical Problem

The purpose of the disclosure is to provide an answer correction method, a device, an electronic equipment and a computer-readable storage medium, so as to solve the problem in related art, namely, the correct position of the answer filled in by students cannot be recognized and thus causing troubles for correcting answers.

To achieve the above purpose, the disclosure provides an answer correction method, wherein the method includes the following steps:

Searching in a question bank according to the test paper to be corrected to determine the target test paper that matches the test paper to be corrected;

Marking the area of each answer on the test paper to be corrected as the first answer set, and marking the area of each answer on the target test paper as the second answer set;

Utilizing a first preset algorithm to preliminarily match each answer area in the first answer set with each answer area in the second answer set, and adjusting the position of the preliminarily matched answer area in the first answer set on the test paper to be corrected according to the position of the answer area in the second answer set on the target test paper;

For each answer area in the second answer set, determining the target answer area in the first answer set according to the position information of the answer area in the second answer set on the target test paper, and correcting the answer in the determined target answer area according to the answer in the answer area in the second answer set, wherein the adjusted position of the target answer area on the test paper to be corrected is the closest to the position of the answer area in the second answer set on the target test paper.

Optionally, the method for determining the target answer area includes:

Utilizing a second preset algorithm to perform a bipartite graph minimum weight matching on each adjusted answer area in the first answer set and each answer area in the second answer set to obtain the final matching result between the answer area in the first answer set and the answer area in the second answer set.

Optionally, the first preset algorithm includes: a coherent point drift algorithm.

Optionally, the second preset algorithm includes: a ford fulkerson algorithm.

Optionally, when the number of answer areas in the second answer set is less than or equal to two, the final matching result between the answer area in the first answer set and the answer area in the second answer set is determined directly based on the preset matching rule.

Optionally, the preset matching rule includes:

When the number of answer areas in the second answer set is equal to one, the answer areas in the first answer set are directly matched with the answer areas in the second answer set.

Optionally, the preset matching rule includes:

When the number of answer areas in the second answer set is equal to two, the coordinate difference in the X-axis direction and the coordinate difference in the Y-axis direction of the two answer areas in the second answer set are calculated, and the direction with the larger coordinate difference is taken as the target direction;

The two answer areas in the first answer set and the two answer areas in the second answer set are sorted respectively according to the coordinates of the target direction, and final matching is performed on the two answer areas in the first answer set and the two answer areas in the second answer set according to the sorting result.

Optionally, the method further includes:

Obtaining the standard answer corresponding to each question on the target test paper;

Matching each standard answer with each answer on the test paper to be corrected, determining the matching result with the smallest error rate as the target matching result, and correcting each answer on the test paper to be corrected according to the target matching result.

Optionally, the step of searching in the question bank according to the test paper to be corrected to determine the target test paper that matches the test paper to be corrected includes:

Detecting the image of the test paper to be corrected, detecting the area of each question to be corrected on the test paper to be corrected, and identifying the text content of the stem of each question to be corrected;

Obtaining the feature vector of the question to be corrected according to the text content of the stem of each question to be corrected, and searching in the question bank according to the feature vector of the question to be corrected to find the question closest to the question to be corrected;

Summarizing all the test papers where the question closest to the question to be corrected are found, and determining the test paper which satisfies the preset condition as the target test paper that matches the test paper to be corrected.

In order to achieve the above purpose, the disclosure also provides an answer correction device, which includes:

A determining module, configured to search in the question bank according to the test paper to be corrected, and determine the target test paper that matches the test paper to be corrected;

A marking module, configured to mark the area of each answer on the test paper to be corrected as the first answer set, and mark the area of each answer on the target test paper as the second answer set;

An adjusting module, configured to use a first preset algorithm to preliminarily match each answer area in the first answer set with each answer area in the second answer set, and adjust the position of the preliminarily matched answer area in the first answer set on the test paper to be corrected according to the position of the answer area in the second answer set on the target test paper;

A correction module, configured to, for each answer area in the second answer set, determine the target answer area in the first answer set according to the position information of the answer area in the second answer set on the target test paper, and correct the answer in the determined target answer area according to the answer in the answer area in the second answer set, wherein the adjusted position of the target answer area on the test paper to be corrected is the closest to the position of the answer area in the second answer set on the target test paper.

Optionally, a matching module is further included to determine the target answer area, and utilize a second preset algorithm to perform a bipartite graph minimum weight matching on each adjusted answer area in the first answer set and each answer area in the second answer set to obtain the final matching result between the answer area in the first answer set and the answer area in the second answer set.

Optionally, the first preset algorithm includes: a coherent point drift algorithm.

Optionally, the second preset algorithm includes: a ford fulkerson algorithm.

Optionally, a first processing module is further included and configured to, when the number of answer areas in the second answer set is less than or equal to two, the final matching result between the answer area in the first answer set and the answer area in the second answer set is determined directly based on the preset matching rule.

Optionally, the preset matching rule includes:

When the number of answer areas in the second answer set is equal to one, the answer areas in the first answer set are directly matched with the answer areas in the second answer set;

When the number of answer areas in the second answer set is equal to two, the coordinate difference in the X-axis direction and the coordinate difference in the Y-axis direction of the two answer areas in the second answer set are calculated, and the direction with the larger coordinate difference is taken as the target direction;

The two answer areas in the first answer set and the two answer areas in the second answer set are sorted respectively according to the coordinates of the target direction, and final matching is performed on the two answer areas in the first answer set and the two answer areas in the second answer set according to the sorting result.

Optionally, a second processing module is further included to obtain the standard answer corresponding to each question on the target test paper; match each standard answer with each answer on the test paper to be corrected, determine the matching result with the smallest error rate as the target matching result, and correct each answer on the test paper to be corrected according to the target matching result.

Optionally, the determining module includes:

A detecting sub-module, configured to detect the image of the test paper to be corrected, detect the area of each question to be corrected on the test paper to be corrected, and identify the text content of the stem of each question to be corrected;

A searching sub-module, configured to obtain the feature vector of the question to be corrected according to the text content of the stem of each question to be corrected, and search in the question bank according to the feature vector of the question to be corrected to find the question closest to the question to be corrected;

A determining sub-module, configured to summarize all the test papers where the question closest to the question to be corrected are found, and determine the test paper which satisfies the preset condition as the target test paper that matches the test paper to be corrected.

To achieve the above purpose, the disclosure also provides an electronic equipment, including a processor, a communication interface, a memory, and a communication bus, wherein the processor, the communication interface, and the memory communicate with the communication bus to realize communication with one another.

The memory is configured to store computer programs.

When the processor is configured to execute the program stored in the memory, any one of the steps of the answer correction method described above is implemented.

In order to achieve the above purpose, the disclosure also provides a computer-readable storage medium in which a computer program is stored, and when the computer program is executed by a processor, any one of the steps of the answer correction method described above is implemented.

Compared with the related art, the disclosure adopts a preset algorithm to match each answer area on the target test paper with each answer area on the test paper to be corrected, and adjust the position of each answer on the test paper to be corrected according to the position information of each answer area on the target test paper. The adjusted answer position is close to the position of the standard answer on the target test paper. Under the circumstances, the answer area closest to the standard answer position can be found from the test paper to be corrected as the target answer area according to the position information of the standard answer on the target test paper, and then the answers in the target answer area can be corrected, thereby solving the problem of related art, namely, the correct position of the answer filled in by students cannot be recognized and thus causing troubles for correcting answers. Also, the efficiency and accuracy of answer correction can be enhanced.

BRIEF DESCRIPTION OF THE DRAWINGS

FIG. 3 is a detailed flowchart of step S101 in the embodiment shown in FIG. 2.

FIG. 4 is a schematic structural view of an answer correction device described in an embodiment of the disclosure.

DESCRIPTION OF THE EMBODIMENTS

The answer correction method, device, electronic equipment, and computer-readable storage medium provided by the disclosure will be described in further detail below with reference to the accompanying drawings and specific embodiments. The advantages and features of the disclosure will be clearer with reference to the claims and the following description. It should be noted that the drawings are in a very simplified form and illustrated with unprecise proportions, which only serve to conveniently and clearly assist in explaining the embodiments of the disclosure.

To solve the problems in the related art, the embodiments of the disclosure provide an answer correction method, a device, an electronic equipment, and a computer-readable storage medium.

It should be noted that the answer correction method in the embodiment of the disclosure can be applied to the answer correction device in the embodiment of the disclosure, and the answer correction device can be configured on an electronic equipment, wherein the electronic equipment may be a personal computer, a mobile terminal, etc. The mobile terminal may be a hardware device with various operation systems, such as a mobile phone, a tablet computer.

Embodiment 1

Figures 1, 2:
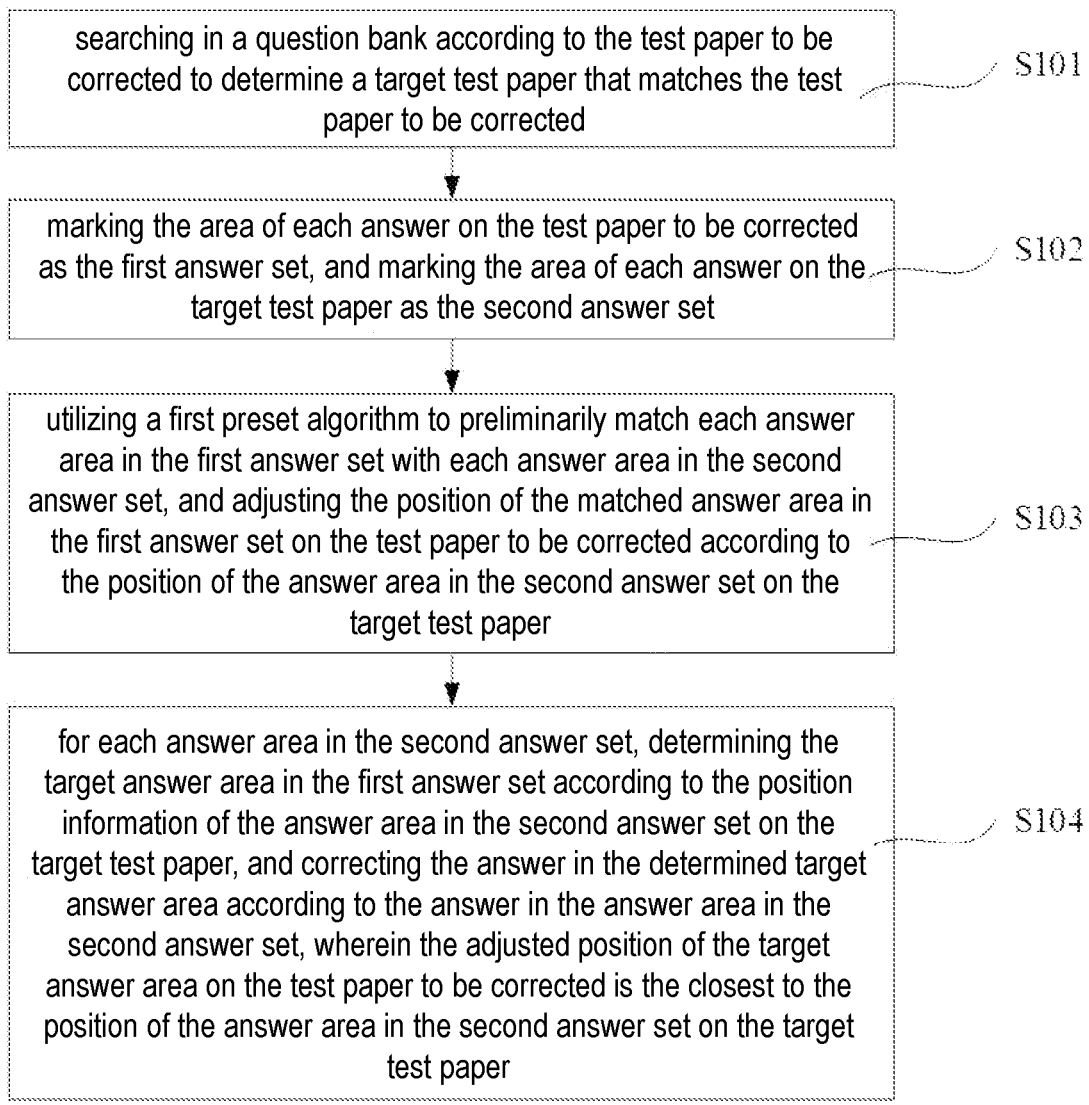
FIG. 1 is an example of answering a test paper described in an embodiment of the disclosure.
FIG. 2 is a schematic flowchart of an answer correction method described in an embodiment of the disclosure.

FIG. 2 is a schematic flowchart of an answer correction method described in an embodiment of the disclosure. Please refer to FIG. 2. An answer correction method may include the following steps:

Step S101, searching in a question bank according to the test paper to be corrected to determine a target test paper that matches the test paper to be corrected, wherein the test papers in the question bank can be filled in with correct answers. The correct answer can be a handwritten answer filled in manually by the teacher, or a standard answer in printed fonts.

Step S102, marking the area of each answer on the test paper to be corrected as the first answer set, and marking the area of each answer on the target test paper as the second answer set.

Specifically, a pre-trained neural network recognition model can be utilized to identify each answer on the test paper to be corrected and the target test paper, and mark the area of each answer. It can be understood that, for each answer area in the first answer set and the second answer set, their position information in the test paper can also be marked. Certainly, the answer area can also be marked by a manual marking method, and the disclosure provides no limitation to the marking method.

Step S103, utilizing a first preset algorithm to match each answer area in the first answer set with each answer area in the second answer set (i.e., preliminarily matching), and adjusting the position of the matched answer area in the first answer set on the test paper to be corrected according to the position of the answer area in the second answer set on the target test paper.

In practical applications, the first preset algorithm may be: a coherent point drift algorithm. The coherent point drift algorithm is a robust point set matching algorithm based on Gaussian mixture model. This algorithm is suitable for the registration of multidimensional point sets under rigid and non-rigid transformation, and has relatively robust impact on noise, out-of-grid point and defect point.

It should be noted that the coherent point drift algorithm only matches the answer areas in the first answer set with the answer areas in the second answer set, and does not adjust the position of each answer area in the first answer set. Therefore, after matching, based on the position of the answer area in the second answer set on the target test paper, the position of the matched answer area in the first answer set on the test paper to be corrected is adjusted, such that the position of the moved answer area in the first answer set is very close to the position of the corresponding answer area in the second answer set. In fact, this process does not make each answer area in the first answer set and the second answer set truly match, but actually to modify the position of the answer area in the first answer set, so that the operation for determining the target answer area in step S104 is more accurate.

Those skilled in the art can understand that briefly the coherent point drift algorithm is an algorithm that performs point mapping based on shape. For example, a certain answer area as a whole in the second answer set is a square, and the corresponding answer area in the first answer set is also an approximate square as a whole. The coherent point drift algorithm can make the vertices of these two squares to correspond to each other, in this manner, the position of the corresponding answer area in the first answer set is adjusted to a position very close to the standard answer. In general, the coherent point drift algorithm is to adjust the overall shape of the answer area in the first answer set to be close to the overall shape of the answer area in the second answer set, so that the two become similar in shape.

It should be noted that, when the number of answer areas in the first answer set and the second answer set is equal, it means that the test paper to be corrected does not contain unanswered questions. The above preset algorithm can be utilized to match each answer area in the first answer set and the second answer set one by one, and adjust the positions of the answer areas in the first answer set. When the number of answer areas in the first answer set and the second answer set is not equal, it means that there are unanswered questions in the test paper to be corrected, the unanswered questions can be ignored first, and other answer areas with answered questions are matched according to the position information. The set consisting of other answer areas with answered questions is subjected to coherent point drift algorithm first, and the positions of other answer areas with answered questions are moved to the positions of standard answers as close as possible. As for the method of dealing with unanswered questions, identification may be performed according to the position information of each question on the test paper to be corrected and the position of the answer on the target test paper, and the answer areas with unanswered questions are marked. In two answer areas, if the position of a handwritten answer on the test paper to be corrected overlaps another one, then both of the answer areas are marked. After performing matching subsequently by using the coherent point drift algorithm, the handwritten answer will be moved to the closer answer area. Under the circumstances, another answer area as unanswered area is marked with original blank mark points.

Step S104, for each answer area in the second answer set, determining the target answer area in the first answer set according to the position information of the answer area on the target test paper, that is, to realize (true) matching (i.e., performing final matching) between the answer areas in the first answer set and the answer areas in the second answer set. The target answer area is the area matched with the answer area in the second answer set (for different answer areas in the second answer set, the target answer area will also change accordingly), and the answers in the determined target answer area are corrected according to the answers in the answer area, wherein the adjusted position of the target answer area on the test paper to be corrected is closest to the position of the answer area in the target test paper.

In practical applications, after adjusting the positions of the answer areas in the first answer set in step S103, the position of each answer area in the first answer set is already very close to the position of the corresponding standard answer in the second answer set. Therefore, for each answer area in the second answer set, the answer area closest to the position of the answer area can be found from the first answer set as the target answer area according to the position information of the answer area, and then the answer in the answer area is compared with the answer in the target answer area for correction.

Further, in order to improve the efficiency of correction, when the number of answers in the second answer set marked in step S102 is less than or equal to two, the final matching result between the answer area in the first answer set and the answer area in the second answer set can be determined directly based on the preset matching rule, and then correction can be performed to the answer area in the first answer set according to the determined matching result.

Specifically, when the number of answer areas in the second answer set is equal to one, the preset matching rule may include: directly matching the answer areas in the first answer set with the answer areas in the second answer set. For example, if there is only one answer in the second answer set and the answer area is A, and there is only one answer in the first answer set and the answer area is A', then the answer areas A and A' are directly matched.

When the number of answer areas in the second answer set is equal to two, the preset matching rule may include: calculating the coordinate difference in the X-axis direction and the coordinate difference in the Y-axis direction of the two answer areas in the second answer set, and taking the direction with larger coordinate difference as the target direction.

The two answer areas in the first answer set and the two answer areas in the second answer set are sorted respectively according to the coordinates of the target direction, and matching is performed on the two answer areas in the first answer set and the two answer areas in the second answer set according to the sorting result.

It can be understood that if there is a large coordinate difference in X-axis directions of the two answer areas in the second answer set, it will be regarded that the two answer areas are distributed left and right, then the two answers on the left and right in the first answer set respectively correspond to the two answer areas on the left and right in the second answer set. If there is a large coordinate difference in Y-axis directions of the two answer areas in the second answer set, it is determined that the two answer areas are distributed up and down, then the two answers at the top and bottom in the first answer set respectively correspond to the two answer areas at the top and bottom in the second answer set. Therefore, the direction with larger coordinate difference is selected as the target direction, and the two answer areas in the first answer set and the two answer areas in the second answer set are respectively sorted according to the coordinates of the target direction, and they are matched one by one according to the sorting result, thus obtaining a matching result.

Further, the answer correction can also be carried out in the following ways: obtaining standard answers corresponding to each question on the target test paper; matching each standard answer with each answer on the test paper to be corrected, determining the matching result with the smallest error rate as the target matching result, and correcting each answer on the test paper to be corrected according to the target matching result. This type of correction can be applied but not limited to the following two situations:

1. When there are only the content of standard answers for the target test paper in the question bank, and the target test paper itself does not exist, that is, there is a lack of position information for each answer in the second answer set corresponding to the target test paper. Under the circumstances, based on the ID of the determined target test paper, the content of standard answer corresponding to the ID of the test paper can be obtained from the question bank. Then, each answer in the second answer set can be matched with each answer in the first answer set, as long as the matching between the $A^{th}$ answer in the second answer set and the $a^{th}$ answer in the first answer set makes the correction result for the $a^{th}$ answer in the first answer set correct, such matching can be adopted, thereby searching for the matching scheme with the least correction error to be the finally determined target matching result. For example, assuming that there are three answers in the second answer set, namely: 1, 2, and 3. The answers in the first answer set are: 2, 3, and 4, then the matching result with the smallest error rate (i.e., the target matching result) is: 1 is matched with 4, 2 is matched with 2, and 3 is matched with 3.

2. When the target test paper itself exists in the question bank, and the target test paper itself is filled in with the correct answer, that is, each answer in the second answer set corresponding to the target test paper has position information. Under the circumstances, marking may not be performed, but only the content of each answer on the target test paper and the test paper to be corrected is identified and used as the content of the answer in the second answer set and the first answer set respectively. Then, each answer in the second answer set and each answer in the first answer set are directly matched. As long as the matching between the $A^{th}$ answer in the second answer set and the $a^{th}$ answer in the first answer set makes the correction result for the $a^{th}$ answer in the first answer set correct, such matching can be adopted, thereby searching for the matching scheme with the least correction error to be the finally determined target matching result. Compared with the above-mentioned matching method by using a preset algorithm, this matching method can reduce the amount of calculation and increase the matching speed.

Next, step S101 will be described in detail. As shown in FIG. 3, in step S101, the step of searching in the question bank according to the test paper to be corrected to determine a target test paper that matches the test paper to be corrected may specifically include the following steps:

Step S1011, detecting the image of the test paper to be corrected, detecting the areas of the questions to be corrected on the test paper to be corrected, and identifying the text content of the stem of the questions to be corrected.

Specifically, the image of the test paper to be corrected can be detected by using a detecting model to detect the area of each question to be corrected on the test paper to be corrected. The detecting model is a model based on a neural network, wherein the detecting model may be, for example, obtained by training samples in the test sample training set based on deep convolutional neural networks (CNN). The trained detecting model is utilized to extract the two-dimensional feature vector from the image of the test paper to be corrected, anchor points with different shapes are generated in each grid of the two-dimensional feature vector, and groundtruth boxes are used to mark the area of each detected question to be corrected. Further, the groundtruth boxes and the generated anchor points can be subjected to a regression process. After identifying the areas of questions, each question to be corrected will be cut into a single image, or not actually cut, but the area of each question to be corrected is separated from one another into a single area image for processing, and sorting is performed according to the position information of the questions.

After detecting the area of each question to be corrected, a character identification model can be used to identify the text content of the stem in the area of the question to be corrected. The character identification model is a model based on neural network. First, the various components in the question to be corrected can be marked, the components may include stem, answer and/or picture (which can be marked by using a pre-trained and pre-established identification model), and the text content of the stem, answer and/or picture in the question is identified by using the character identification model. Specifically, the character identification model may be established based on hollow convolution and attention model. Specifically, the hollow convolution is used to extract the feature of the groundtruth boxes corresponding to the stem, answer and/or picture, and then the extracted feature is decoded into characters by using the attention model. Furthermore, the character identification model may include an identification model for printed fonts and an identification model for handwritten fonts, wherein the text content of stems and pictures is in printed font, and the text content of answers is in handwritten font. The identification model for printed font is utilized to identify the text content of stems and pictures, and the identification model for handwritten font is utilized to identify the text content of answers. The identification model for printed font and the identification model for handwritten font are trained separately.

Step S1012, obtaining the feature vector of the questions to be corrected according to the text content of the stem of each question to be corrected, and searching in the question bank according to the feature vector of the question to be corrected to find the question closest to the question to be corrected.

Specifically, the step S1012 may further include:

Step A, inputting the text content of the stem of each question to be corrected into the pre-trained stem vectoring model to obtain the feature vector of the stem of each question to be corrected as the feature vector of each question to be corrected, wherein the stem vectoring model is a model based on neural network.

For example, assuming that the text content of the stem in the question to be corrected is "4. Xiaoming walks for 3 minutes to reach halfway of the whole journey, how many meters is his home away from his school? (6 points)", the text content is input into the pre-trained stem vectoring model—the sent2vec model, then the feature vector of the stem is obtained. The feature vector can be expressed as [x0, x1, x2 . . . , xn].

Specifically, the stem vectoring model may be a neural network-based model, such as a CNN model, and the stem vectoring model may be obtained through training in the following steps: marking each question sample in the first question sample training set to mark the text content of the stem in each question sample; using the neural network model to extract the two-dimensional feature vector of the text content of the stem in each question sample, thereby obtaining the stem vectoring model through training, wherein the specific training process belongs to the related art and will not be repeated here.

Step B: for each question to be corrected, searching in the question bank to find the feature vector matching the feature vector of the question to be corrected, and determining the question corresponding to the matched feature vector in the question bank to be the question closest to the question to be corrected.

Specifically, the feature vector matching the feature vector of the question to be corrected can be found in the question bank by means of vector approximate search, specifically: searching for the feature vector closest to the feature vector of the question to be corrected in the question bank. It can be understood that the similarity measurement between different vectors typically adopts calculation of distance between vectors, and common distance calculation methods include: Euclidean distance, Manhattan distance, angle cosine, and so on. The calculation method adopted in this embodiment is angle cosine.

Preferably, in order to facilitate the search for feature vectors, an index information table may also be established in advance for the feature vector of each question on the test paper in the question bank. The index information table can store the feature vector of each question in the question bank, the specific content of the question, and the ID of the test paper where the question is located.

Correspondingly, step S1012 may further include: for each question to be corrected, searching for a feature vector matching the feature vector of the question to be corrected in the index information table; determining the question corresponding to the matching feature vector in the index information table to be the question closest to the question to be corrected.

It can be understood that after finding the matching feature vector in the index information table, the closest question is found in the index information table, under the circumstances the specific content (including the stem, answers and/or pictures of the question) of the closest question as well as the ID information of the test paper where the closest question is located can be obtained.

Preferably, before establishing the index information table, feature vectors of different lengths can further be grouped according to the length, in this manner, when searching for a feature vector that matches the feature vector of the question to be corrected in the index information table, it is possible to first locate a group that has the same or similar length as the feature vector of the question to be corrected in the index information table, and then search for the feature vector that matches the feature vector of the question to be corrected in the group that has the same length as the feature vector of the question to be corrected in the index information table. Specifically, in the grouping process, feature vectors with the same length may be grouped into a group, or feature vectors with a length within a certain range may be grouped into a group, which is not limited in the disclosure. It can be seen that, by grouping feature vectors of different lengths according to the length, it is possible to make a search in the corresponding group according to the length of the feature vector when searching for the question at a later time, thereby improving the speed of searching the question. It can be understood that the difference in the length of the feature vectors is caused by the difference in the number of words in the stem.

Step S1013, summarizing all the test papers where the question closest to the question to be corrected are found, and determining the test paper which satisfies the preset condition as the target test paper that matches the test paper to be corrected.

Specifically, the test paper satisfying the preset condition is determined as the target test paper matching the test paper to be corrected, which may specifically be: determining the test paper with the highest occurrence frequency and the frequency being greater than the first preset threshold as the target test paper matching the test paper to be corrected. In actual processing, because each question in the question bank has corresponding test paper ID information and position information in the current test paper, it can be determined which test paper that the closest question belongs to based on the ID of the test paper where the closest question is located, thereby determining the ID of the test paper having the highest occurrence frequency and the frequency being greater than the first preset threshold, thus determining the test paper ID as the matching target test paper. Specifically, the occurrence frequency of a certain test paper can be calculated in the following way: the ratio of the number of closest questions on the test paper to the total number of questions to be corrected on the test paper to be corrected, or the ratio of the number of matching questions on the test paper and the test paper to be corrected to the total number of questions to be corrected on the test paper to be corrected. It can be understood that if the occurrence frequency of the test paper with the highest occurrence frequency is less than the first preset threshold, it means that the number of matching questions on the test paper with the highest occurrence frequency and the test paper to be corrected is too small. Under the circumstances, it can be regarded that there is no target test paper that matches the test paper to be corrected in the question bank.

Compared with the related art, the disclosure adopts the first preset algorithm to match each answer area in the target test paper with each answer area in the test paper to be corrected, and adjust the position of each answer in the test paper to be corrected according to the position information of each answer area in the target test paper. The adjusted position of the answer is close to the position of the standard answer on the target test paper. Under the circumstances, according to the position information of the standard answer on the target test paper, the answer area closest to the position of the standard answer can be found from the test paper to be corrected as the target answer area, then the answer in the target answer area can be corrected, thereby solving the problem of related art, namely, the correct position of the answer filled in by students cannot be recognized and thus causing troubles for correcting answers. Also, the efficiency and accuracy of answer correction can be enhanced.

In the example of filling answers as shown in FIG. 1, after using the solution of the disclosure, the position of each answer area can be moved to their respective standard positions (i.e., each answer area is moved to the position of "=" near the corresponding question), such that it is possible to accurately identify which question that each answer area corresponds to respectively, thereby realizing accurate correction of answers.

Corresponding to the above embodiment of the answer correcting method, the disclosure provides an answer correction device. Referring to FIG. 4, the device may include:

A determining module 201, configured to search in a question bank according to the test paper to be corrected, and determining a target test paper that matches the test paper to be corrected;

A marking module 202, configured to mark the area of each answer on the test paper to be corrected as the first answer set, and mark the area of each answer in the target test paper as the second answer set;

An adjusting module 203, configured to utilize a first preset algorithm to match each answer area in the first answer set with each answer area in the second answer set, and adjust the position of the matched answer area in the first answer set on the test paper to be corrected according to the position of the answer area in the second answer set on the target test paper;

A correction module 204, configured to, for each answer area in the second answer set, determine the target answer area in the first answer set according to the position information of the answer area on the target test paper, and correct the answer in the determined target answer area according to the answer in the answer area, wherein the adjusted position of the target answer area on the test paper to be corrected is the closest to the position of the answer area on the target test paper.

Optionally, the preset algorithm includes: a coherent point drift algorithm.

Optionally, the device further includes a first processing module configured to, when the number of answer areas in the second answer set is less than or equal to two, the final matching result between the answer area in the first answer set and the answer area in the second answer set is determined directly based on the preset matching rule.

Optionally, the preset matching rule includes:

When the number of answer areas in the second answer set is equal to one, the answer areas in the first answer set are directly matched with the answer areas in the second answer set.

Optionally, the preset matching rule includes:

When the number of answer areas in the second answer set is equal to two, the coordinate difference in the X-axis direction and the coordinate difference in the Y-axis direction of the two answer areas in the second answer set are calculated, and the direction with the larger coordinate difference is taken as the target direction;

The two answer areas in the first answer set and the two answer areas in the second answer set are sorted respectively according to the coordinates of the target direction, and final matching is performed on the two answer areas in the first answer set and the two answer areas in the second answer set according to the sorting result.

Optionally, the device further includes a second processing module configured to obtain the standard answer corresponding to each question on the target test paper; match each standard answer with each answer on the test paper to be corrected, determine the matching result with the smallest error rate as the target matching result, and correct each answer on the test paper to be corrected according to the target matching result.

Optionally, the determining module 201 includes:

A detecting sub-module, configured to detect the image of the test paper to be corrected, detect the area of each question to be corrected on the test paper to be corrected, and identify the text content of the stem of each question to be corrected;

A searching sub-module, configured to obtain the feature vector of the question to be corrected according to the text content of the stem of each question to be corrected, and search in the question bank according to the feature vector of the question to be corrected to find the question closest to the question to be corrected;

A determining sub-module, configured to summarize all the test papers where the question closest to the question to be corrected are found, and determine the test paper which satisfies the preset condition as the target test paper that matches the test paper to be corrected.

Figure 5:
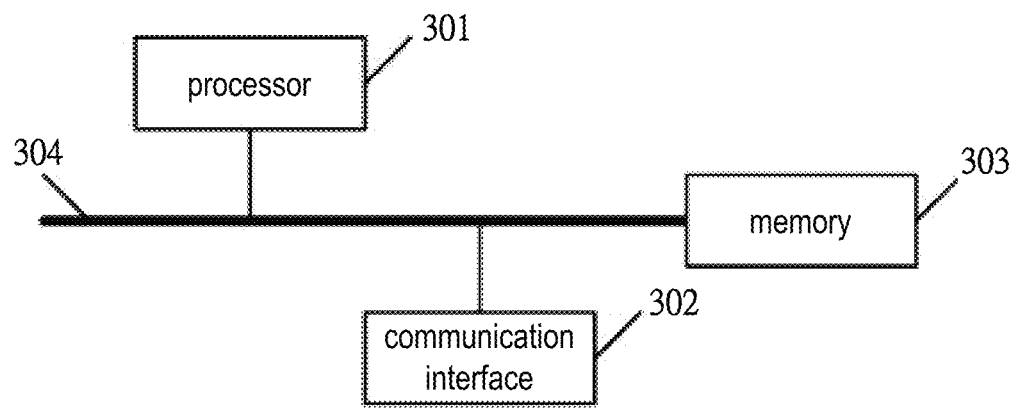
FIG. 5 is a schematic structural view of an electronic equipment described in an embodiment of the disclosure.

The disclosure further provides an electronic equipment, as shown in FIG. 5, which includes a processor 301, a communication interface 302, a memory 303, and a communication bus 304, wherein the processor 301, the communication interface 302, and the memory 303 communicate with the communication bus 304 to realize communication with one another.

The memory 303 is configured to store computer programs.

The processor 301 is configured to execute the program stored in the memory 303, and implement the following steps:

Searching in a question bank according to the test paper to be corrected to determine the target test paper that matches the test paper to be corrected;

Marking the area of each answer on the test paper to be corrected as the first answer set, and marking the area of each answer on the target test paper as the second answer set;

Utilizing a preset algorithm to match each answer area in the first answer set with each answer area in the second answer set, and adjusting the position of the matched answer area in the first answer set on the test paper to be corrected according to the position of the answer area in the second answer set on the target test paper;

For each answer area in the second answer set, determining the target answer area in the first answer set according to the position information of the answer area on the target test paper, and correcting the answer in the determined target answer area according to the answer in the answer area, wherein the adjusted position of the target answer area on the test paper to be corrected is the closest to the position of the answer area on the target test paper.

For specific implementation of each step of the method and related description, please refer to the foregoing method embodiment shown in FIG. 2, and the details are not repeated here.

In addition, other implementation methods of the answer correction method implemented by the processor 301 which executes the program stored in the memory 303 are the same as the implementation methods mentioned in part of the foregoing method embodiment, and will not be repeated here.

The communication bus mentioned in the above electronic equipment may be a peripheral component interconnect (PCI) standard bus or an extended industry standard architecture (EISA) bus, etc. The communication bus can be divided into address bus, data bus, control bus, etc. For ease of illustration, the communication bus is only denoted by a thick line in the figure, but which does not mean that there is only one bus bar or one type of bus bar.

The communication interface is configured for communication between the above electronic equipment and other equipment.

The memory may include random access memory (RAM) or non-volatile memory (NVM), such as at least one disk memory. Optionally, the memory may also be at least one storage device located away from the foregoing processor.

The aforementioned processor may be a general-purpose processor, including a central processing unit (CPU), a network processor (NP), etc.; or a digital signal processor (DSP), application specific integrated circuit (ASIC), field-programmable gate array (FPGA) or other programmable logic devices, discrete gate or transistor logic devices, discrete hardware components.

The disclosure also provides a computer-readable storage medium in which a computer program is stored, and when the computer program is executed by a processor, the steps of the answer correction method described above are implemented.

Embodiment 2

The difference between Embodiment 2 and Embodiment 1 is that the method for determining the target answer area includes: utilizing a second preset algorithm to perform a bipartite graph minimum weight matching on each adjusted answer area in the first answer set and each answer area in the second answer set to obtain the final matching result between the answer area in the first answer set and the answer area in the second answer set.

Figure 6:
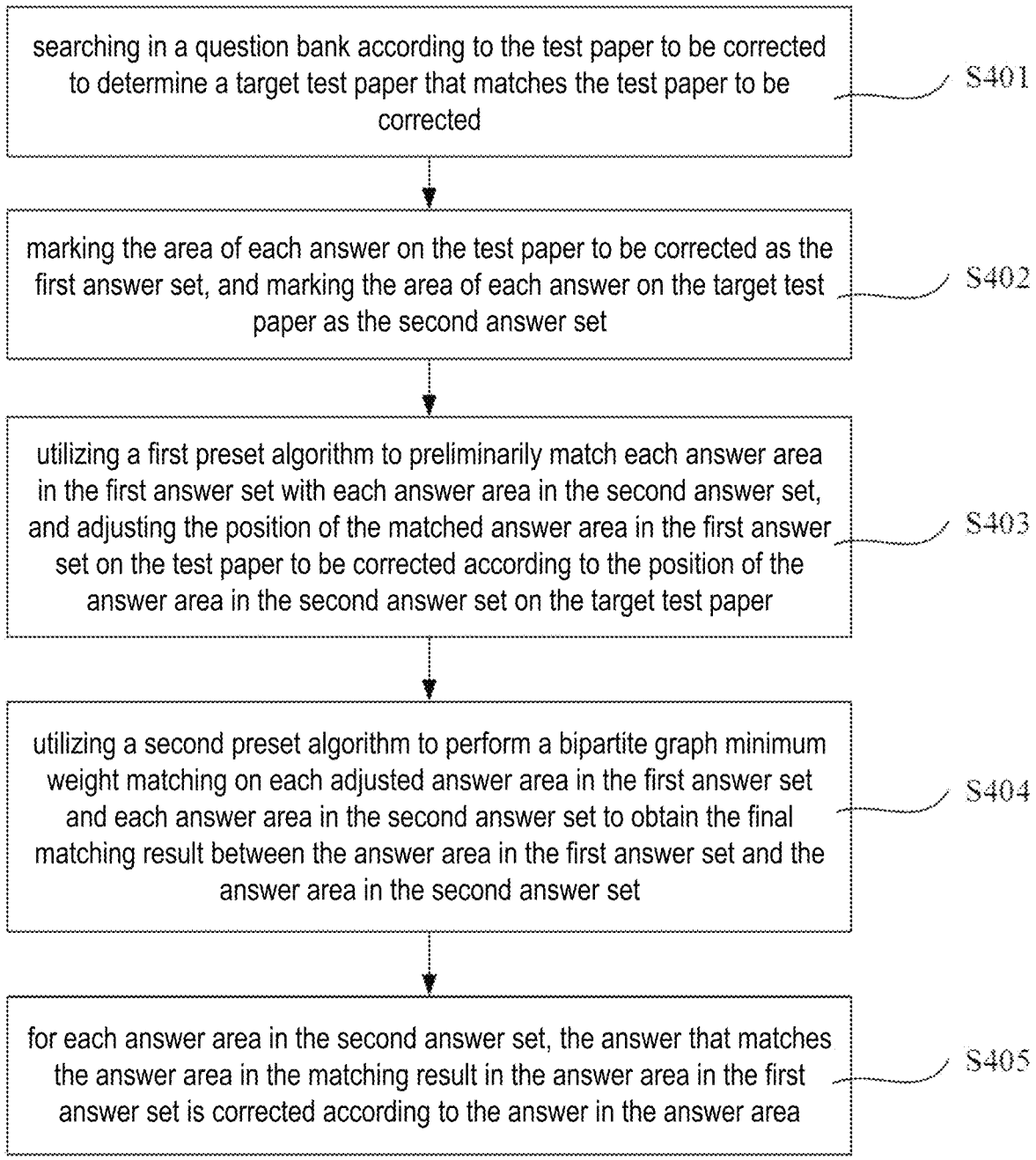
FIG. 6 is a schematic flowchart of an answer correction method described in an embodiment of the disclosure.

Specifically, please refer to FIG. 6, which is a schematic flowchart of an answer correction method provided by an embodiment of the disclosure. As shown in FIG. 6, an answer correction method may include the following steps:

Step S401, searching in a question bank according to the test paper to be corrected to determine a target test paper that matches the test paper to be corrected, wherein the test papers in the question bank can be filled in with correct answers. The correct answer can be a handwritten answer filled in manually by the teacher, or a standard answer in printed fonts.

Step S402, marking the area of each answer on the test paper to be corrected as the first answer set, and marking the area of each answer on the target test paper as the second answer set.

Step S403, utilizing a first preset algorithm to match each answer area in the first answer set with each answer area in the second answer set (i.e., preliminarily matching), and adjusting the position of the matched answer area in the first answer set on the test paper to be corrected according to the position of the answer area in the second answer set on the target test paper.

Step S404, utilizing a second preset algorithm to perform a bipartite graph minimum weight matching on each adjusted answer area in the first answer set and each answer area in the second answer set to obtain the final matching result between the answer area in the first answer set and the answer area in the second answer set.

In practical applications, the second preset algorithm may be: ford fulkerson algorithm. The ford fulkerson algorithm is a general method to deal with the maximum flow problem. This algorithm is actually an algorithm idea. It contains several specific implementations at different execution times. From an overall perspective, the ford-fulkerson algorithm idea is an iterative operation algorithm.

The ford fulkerson algorithm is utilized to perform the bipartite graph minimum weight matching. Inherently, the algorithm is to find a matching scheme with the smallest matching distance between points, and abstract the mapping of points into the bipartite graph matching. The algorithm seeks to establish a scheme for finding the connection line with the shortest total length, and ultimately to find the connection line with the shortest total length between the position of each answer area in the first answer set and the position of each answer area in the second answer set as the final matching result. In the disclosure, the ford fulkerson algorithm is utilized to perform the bipartite graph minimum weight matching. The distance between the answer area in the first answer set and the answer area in the second answer set is regarded as the weight, and the minimum weight scheme for bipartite graph matching is obtained, thus the required matching result is attained.

Step S405, for each answer area in the second answer set, the answer that matches the answer area in the matching result in the answer area in the first answer set is corrected according to the answer in the answer area.

In practical applications, after the matching result is obtained in step S404, in an implementation, the answer area in the first answer set and the answer area in the second answer set may be firstly corresponded to each other according to the matching result. Then, each answer area in the second answer set is compared with the answer in the corresponding answer area in the first answer set for correction. In another implementation, directly for each answer area in the second answer set, the corresponding answer area in the first answer set may be found according to the matching result, and then the answers in the two answer areas are compared for correction.

Figure 7:
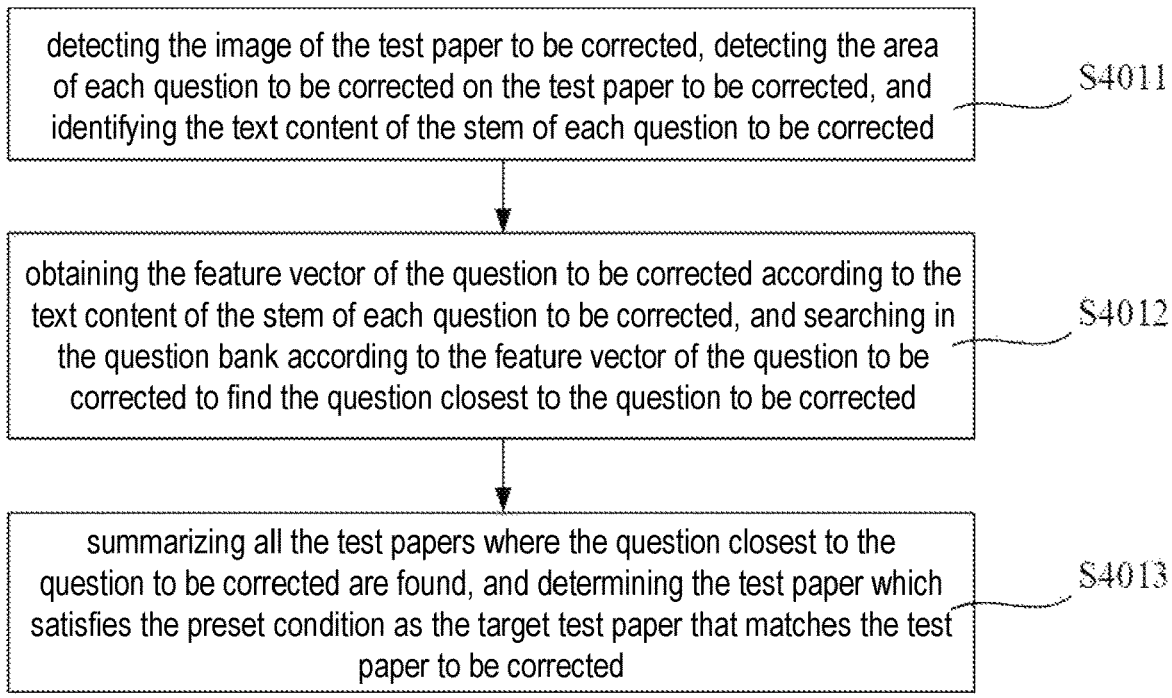
FIG. 7 is a detailed flowchart of step S401 in the embodiment shown in FIG. 6.

In the embodiment of the disclosure, as shown in FIG. 7, the step S401 of searching in a question bank according to the test paper to be corrected to determine a target test paper that matches the test paper to be corrected may specifically include the following steps:

Step S4011, detecting the image of the test paper to be corrected, detecting the area of each question to be corrected on the test paper to be corrected, and identifying the text content of the stem of each question to be corrected.

Step S4012, obtaining the feature vector of the question to be corrected according to the text content of the stem of each question to be corrected, and searching in the question bank according to the feature vector of the question to be corrected to find the question closest to the question to be corrected.

Step S4013, summarizing all the test papers where the question closest to the question to be corrected are found, and determining the test paper which satisfies the preset condition as the target test paper that matches the test paper to be corrected.

Figure 8:
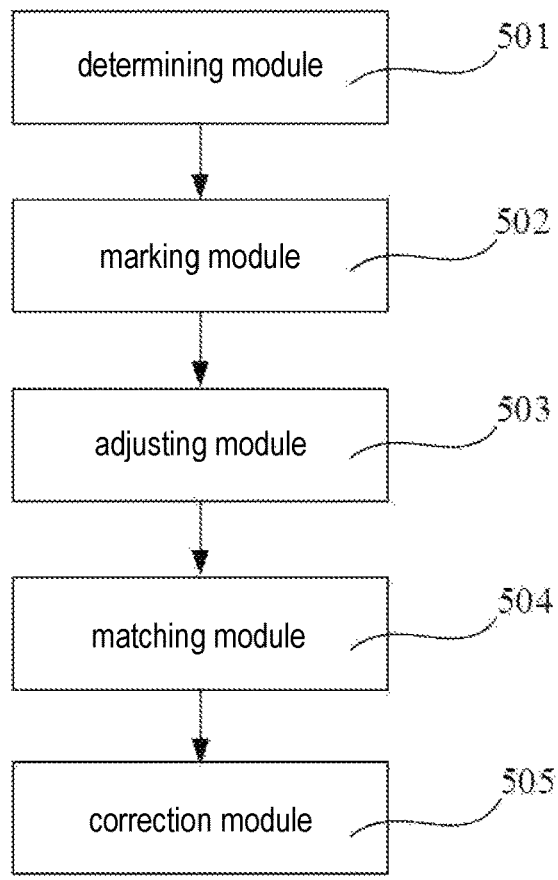
FIG. 8 is a schematic structural view of an answer correction device described in an embodiment of the disclosure.

Corresponding to the above embodiment of the answer correction method, the disclosure provides an answer correction device. Referring to FIG. 8, the device may include:

A determining module 501, configured to search in the question bank according to the test paper to be corrected, and determine the target test paper that matches the test paper to be corrected;

A marking module 502, configured to mark the area of each answer on the test paper to be corrected as the first answer set, and mark the area of each answer on the target test paper as the second answer set;

An adjusting module 503, configured to use a first preset algorithm to match each answer area in the first answer set with each answer area in the second answer set, and adjust the position of the matched answer area in the first answer set on the test paper to be corrected according to the position of the answer area in the second answer set on the target test paper;

A matching module 504, configured to utilize a second preset algorithm to perform a bipartite graph minimum weight matching on each adjusted answer area in the first answer set and each answer area in the second answer set to obtain the matching result between the answer area in the first answer set and the answer area in the second answer set;

A correction module 505, configured to, for each answer area in the second answer set, correct the answer that matches the answer area in the matching result in the answer area in the first answer set according to the answer in the answer area.

Optionally, the second preset algorithm includes: a ford fulkerson algorithm.

In Embodiment 2 of the disclosure, the second preset algorithm is utilized to perform a bipartite graph minimum weight matching on each adjusted answer area in the first answer set and each answer area in the second answer set, so as to obtain the final matching result between the answer area in the first answer set and the answer area in the second answer set, thus achieving highly efficient and reliable matching between the answer areas in the first answer set and the answer areas in the second answer set. In this manner, the problem of related art, namely, the correct position of the answer filled in by students cannot be recognized and thus causing troubles for correcting answers, can be solved, and the efficiency and accuracy of answer correction can be improved.

The part that is not described in Embodiment 2, for example, the method of marking the area of each answer in the test paper to be corrected and the target test paper, the selection of the first preset algorithm, etc. may be derived from corresponding descriptions in Embodiment 1, and thus no further details are incorporated in Embodiment 2.

It should be noted that the embodiments in this specification are described in a related manner, and the same or similar parts in the embodiments can be cross-referenced from one another, and each embodiment focuses on the differences from other embodiments. In particular, for the embodiments of the device, the electronic equipment, and the computer-readable storage medium, since they are basically similar to the method embodiments, the description thereof is relatively simple. For the related description, please refer to the description in the method embodiments.

In this article, relational terms such as first and second are used only to distinguish one subject or operation from another subject or operation, and do not necessarily require or imply that the subjects or operations are actually related to one another in such manner or arranged in such sequence. Moreover, the terms "include", "comprise" or any other variant thereof are intended to involve non-exclusive inclusion, so that a process, method, article or device that includes a series of elements involves not only those elements, but also those not explicitly listed, or other elements that are inherent to this process, method, article, or equipment. Under the circumstances that no further limitation is applied to, the element defined by the sentence "include one . . . " does not exclude that there are other identical elements in the process, method, article or equipment that includes the element.

The above description is only a description of preferred embodiments of the disclosure, and does not limit the scope of the disclosure. Any changes or modifications made by those of ordinary skill in the art according to the above disclosure shall fall within the protection scope of the claims.

What is claimed is:

1. An answer correction method, the method comprises:
searching in a question bank according to a test paper to be corrected to determine a target test paper that matches the test paper to be corrected;
marking each answer area on the test paper to be corrected as a first answer set, and marking each answer area on the target test paper as a second answer set;
utilizing a first preset algorithm to preliminarily match the each answer area in the first answer set with the each answer area in the second answer set, and adjusting a position of a preliminarily matched answer area in the first answer set on the test paper to be corrected according to a position of an answer area in the second answer set on the target test paper; and
determining a target answer area in the first answer set according to position information of the each answer area in the second answer set on the target test paper, and correcting an answer in the determined target answer area according to an answer in the answer area in the second answer set, wherein an adjusted position of the target answer area on the test paper to be corrected is the closest to the position of the answer area in the second answer set on the target test paper;
wherein the method for determining the target answer area comprises:
utilizing a second preset algorithm to perform a bipartite graph minimum weight matching on the each adjusted answer area in the first answer set and the each answer area in the second answer set to obtain a final matching result between the answer area in the first answer set and the answer area in the second answer set.

2. The answer correction method according to claim 1, wherein the first preset algorithm comprises: a coherent point drift algorithm.

3. The answer correction method according to claim 1, wherein the second preset algorithm comprises: a ford fulkerson algorithm.

4. The answer correction method according to claim 1, wherein the final matching result between the answer area in the first answer set and the answer area in the second answer set is determined directly based on a preset matching rule in response to a number of the answer areas in the second answer set is less than or equal to two.

5. The answer correction method according to claim 4, wherein the preset matching rule comprises:
matching directly the answer areas in the first answer set with the answer areas in the second answer set for final matching in the second answer set for final matching in response to the number of the answer areas in the second answer set is equal to one.

6. The answer correction method according to claim 4, wherein the preset matching rule comprises:
calculating a coordinate difference in an X-axis direction and a coordinate difference in an Y-axis direction of the two answer areas in the second answer set in response to the number of the answer areas in the second answer set is equal to two, and taking a direction with larger coordinate difference as a target direction;
sorting respectively the two answer areas in the first answer set and the two answer areas in the second answer set according to coordinates of the target direction, and performing the final matching on the two answer areas in the first answer set and the two answer areas in the second answer set according to a sorting result.

7. The answer correction method according to claim 1, wherein the method further comprises:
obtaining a standard answer corresponding to each question on the target test paper;
matching the each standard answer with the each answer on the test paper to be corrected, determining a matching result with a smallest error rate as a target matching result, and correcting the each answer on the test paper to be corrected according to the target matching result.

8. The answer correction method according to claim 1, wherein the step of searching in the question bank according to the test paper to be corrected to determine the target test paper that matches the test paper to be corrected comprises:
detecting an image of the test paper to be corrected, detecting an area of each question to be corrected on the test paper to be corrected, and identifying text content of a stem of the each question to be corrected;
obtaining a feature vector of the question to be corrected according to the text content of the stem of each question to be corrected, and searching in the question bank according to the feature vector of the question to be corrected to find a question closest to the question to be corrected;
summarizing all the test papers where the question closest to the question to be corrected are found, and determining a test paper which satisfies a preset condition as the target test paper that matches the test paper to be corrected.

9. An electronic equipment, comprising a processor, a communication interface, a memory, and a communication bus, wherein the processor, the communication interface, and the memory communicate with the communication bus to realize communication with one another;
wherein the memory is configured to store a computer program;
when the processor is configured to execute the program stored in the memory, the steps of the method claimed in claim 1 are implemented.

10. A computer-readable storage medium, wherein a computer program is stored therein, and when the computer program is executed by a processor, the steps of the method claimed in claim 1 are implemented.

11. An answer correction device, the device comprises:
a memory, storing a program;
a processor, executing the program to be configured to function as
a determining module, configured to search in a question bank according to the test paper to be corrected, and determine a target test paper that matches the test paper to be corrected;
a marking module, configured to mark an area of each answer on the test paper to be corrected as a first answer set, and mark an area of each answer on the target test paper as a second answer set;

an adjusting module, configured to use a first preset algorithm to preliminarily match the each answer area in the first answer set with the each answer area in the second answer set, and adjust a position of the preliminarily matched answer area in the first answer set on the test paper to be corrected according to a position of the answer area in the second answer set on the target test paper; and a correction module, configured to determine a target answer area in the first answer set according to position information of the each answer area in the second answer set on the target test paper, and correct an answer in the determined target answer area according to the answer in the answer area in the second answer set, wherein an adjusted position of the target answer area on the test paper to be corrected is the closest to the position of the answer area in the second answer set on the target test paper, wherein the processor further executes the program to be configured to function as a matching module configured to determine the target answer area, and utilize a second preset algorithm to perform a bipartite graph minimum weight matching on the each adjusted answer area in the first answer set and the each answer area in the second answer set to obtain a final matching result between the answer area in the first answer set and the answer area in the second answer set.

12. The answer correction device according to claim 11, wherein the first preset algorithm comprises: a coherent point drift algorithm.

13. The answer correction device according to claim 11, wherein the second preset algorithm comprises: a ford fulkerson algorithm.

14. The answer correction device according to claim 11, wherein the processor further executes the program to be configured to function as a first processing module configured to determine directly the final matching result between the answer area in the first answer set and the answer area in the second answer set based on a preset matching rule in response to a number of answer areas in the second answer set is less than or equal to two.

15. The answer correction device according to claim 14, wherein the preset matching rule comprises:

matching directly the answer areas in the first answer set with the answer areas in the second answer set for final matching in response to the number of the answer areas in the second answer set is equal to one;

calculating a coordinate difference in an X-axis direction and a coordinate difference in an Y-axis direction of the two answer areas in the second answer set in response to the number of the answer areas in the second answer set is equal to two, and taking a direction with larger coordinate difference as a target direction; and sorting respectively the two answer areas in the first answer set and the two answer areas in the second answer set according to coordinates of the target direction, and performing the final matching on the two answer areas in the first answer set and the two answer areas in the second answer set according to a sorting result.

16. The answer correction device according to claim 11, wherein the processor further executes the program to be configured to function as a second processing module configured to obtain a standard answer corresponding to each question on the target test paper, match the each standard answer with the each answer on the test paper to be corrected, determine a matching result with a smallest error rate as a target matching result, and correct the each answer on the test paper to be corrected according to the target matching result.

17. The answer correction device according to claim 11, wherein the determining module comprises:

detecting of the test paper to be corrected, detect an area of each question to be corrected on the test paper to be corrected, and identify text content of a stem of the each question to be corrected;

obtaining a feature vector of the question to be corrected according to the text content of the stem of each question to be corrected, and search in the question bank according to the feature vector of the question to be corrected to find a question closest to the question to be corrected;

summarizing all the test papers where the question closest to the question to be corrected are found, and determine a test paper which satisfies a preset condition as the target test paper that matches the test paper to be corrected.

* * * * *